(12) United States Patent
Berghaus et al.

(10) Patent No.: US 11,162,620 B2
(45) Date of Patent: Nov. 2, 2021

(54) PIPE COUPLING

(71) Applicant: VOSS FLUID GMBH, Wipperfürth (DE)

(72) Inventors: Gerd Berghaus, Kürten (DE); Harald Pott, Hückeswagen (DE); Alexander Erbe, Hückeswagen (DE)

(73) Assignee: VOSS Fluid GmbH, Wipperfurth (DE)

( * ) Notice: Subject to any disclaimer, the term of this patent is extended or adjusted under 35 U.S.C. 154(b) by 509 days.

(21) Appl. No.: 16/063,257

(22) PCT Filed: Nov. 10, 2016

(86) PCT No.: PCT/EP2016/077301
§ 371 (c)(1),
(2) Date: Jun. 16, 2018

(87) PCT Pub. No.: WO2017/102190
PCT Pub. Date: Jun. 22, 2017

(65) Prior Publication Data
US 2020/0271252 A1 Aug. 27, 2020

(30) Foreign Application Priority Data

Dec. 18, 2015 (DE) ..................... 10 2015 122 309.0

(51) Int. Cl.
*F16L 19/028* (2006.01)
*B21D 41/02* (2006.01)

(52) U.S. Cl.
CPC .......... *F16L 19/0283* (2013.01); *B21D 41/02* (2013.01); *F16L 19/028* (2013.01)

(58) Field of Classification Search
CPC .. F16L 19/0283; F16L 19/028; F16L 19/0218
USPC .... 285/95, 332, 334.5, 354, 382.5, 386, 353
See application file for complete search history.

(56) References Cited

U.S. PATENT DOCUMENTS

| 920,963 | A | * | 5/1909 | Keyes | |
|---|---|---|---|---|---|
| 1,109,920 | A | * | 9/1914 | Glauber | |
| 2,463,883 | A | * | 3/1949 | Kinsey | F16L 19/028 285/354 |

(Continued)

FOREIGN PATENT DOCUMENTS

| DE | 29908670 U1 | 9/2000 |
|---|---|---|
| DE | 69426302 T2 | 3/2001 |
| DE | 102013105300 A1 | 11/2014 |

*Primary Examiner* — Matthew Troutman
*Assistant Examiner* — William S. Choi
(74) *Attorney, Agent, or Firm* — Eric J. Sosenko; Jonathan P. O'Brien; Honigman LLP

(57) ABSTRACT

A pipe coupling for connecting a pipe and including a pipe, a pipe union, and a clamping element. The pipe exhibits at least one connecting section and a terminal abutting face. The connecting section is formed in an end region of the pipe, wherein the connecting section exhibits at least one sealing surface inclined relative to a longitudinal axis of the pipe. The pipe union including a receiving section for insertion of at least a part of the connecting section, wherein a sealing connection between the pipe and the pipe union is created, in that the connecting section is clamped between the pipe union and the clamping element. The abutting face has a sealing protrusion and the sealing protrusion is formed as a prominence in the abutting face. Furthermore, a pipe, a swaging tool and a process are also provided.

16 Claims, 10 Drawing Sheets

(56) References Cited

U.S. PATENT DOCUMENTS

| | | | |
|---|---|---|---|
| 4,025,092 A * | 5/1977 | Wakefield | |
| 5,002,316 A * | 3/1991 | Chohan | |
| 5,340,163 A * | 8/1994 | Merrer | 285/354 |
| 5,529,349 A | 6/1996 | Gibbs et al. | |
| 5,997,050 A * | 12/1999 | Fleckenstein | F16L 19/028 285/334.5 |
| 6,431,613 B1 * | 8/2002 | Altenrath et al. | |
| 6,517,126 B1 * | 2/2003 | Peterson et al. | F16L 19/028 285/246 |
| 6,663,146 B1 * | 12/2003 | Sakai | 285/353 |
| 7,600,792 B2 * | 10/2009 | Wada | F16L 19/028 285/246 |
| 8,152,204 B2 * | 4/2012 | Pliassounov | B60T 17/043 285/334.5 |
| 9,772,056 B2 * | 9/2017 | Swift | F16L 19/0283 |
| 2007/0052236 A1 * | 3/2007 | Wada | F16L 19/028 |
| 2010/0194096 A1 * | 8/2010 | Seifert | F16L 19/025 285/24 |
| 2013/0307265 A1 * | 11/2013 | Sekino | F16L 19/0283 285/382.5 |
| 2016/0223107 A1 | 8/2016 | Berghaus et al. | |

* cited by examiner

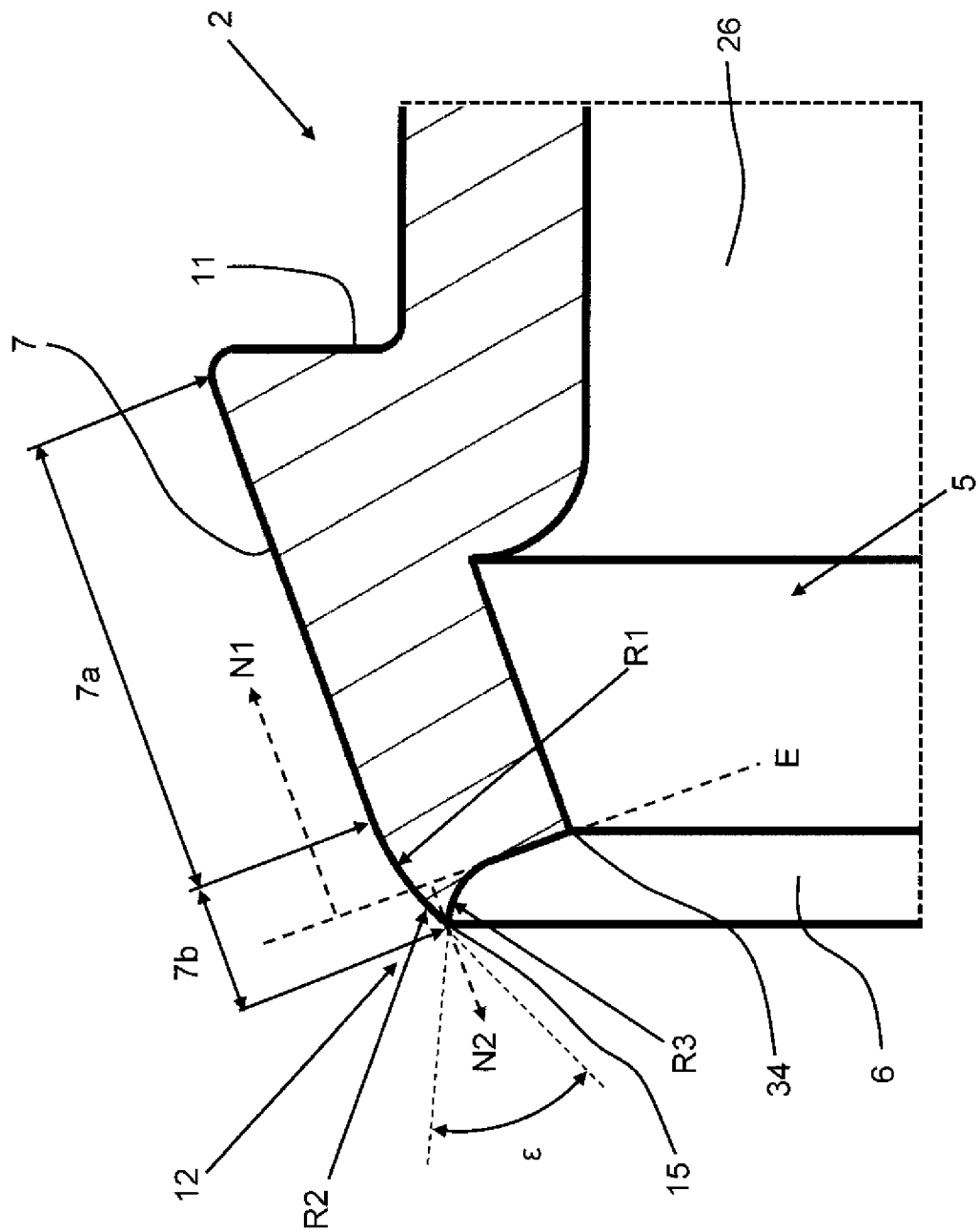

PIPE COUPLING

BACKGROUND

1. Field of the Invention

The present invention pertains to a pipe coupling for connecting a pipe, in particular for creating a sealing connection. The pipe coupling comprises a pipe, a pipe union, and a clamping element. The pipe exhibits at least one connecting section and a terminal abutting face, wherein the connecting section is formed at an end zone of the pipe. The connecting section further comprises at least one sealing surface angled in the direction of the end zone of the pipe. The union of the pipe coupling has a receiving section for receiving at least a part of the connecting section of the pipe. A sealing connection between the pipe and the pipe union is achieved with the clamping element, in that the connecting section is clamped between the pipe union and the clamping element. Furthermore, the invention pertains to a swaging tool for creating a connecting section on a pipe as well as a process for creating a connecting section on a pipe.

2. Description of Related Art

Similar pipe couplings are known in the prior art in a multitude of designs. These types of pipe couplings are used in many technical fields, namely in any case where, for example, pipelines used to carry fluids under high pressure, such as pressures up to 80 MPa, must be connected. Such applications can be found in the automotive industry, process engineering, and the chemical industry, among others. For example, a similar pipe coupling can be found in DE 10 2013 105 300 A1.

In the case of similar pipe couplings in which the sealing effect is usually achieved through the pressing together of metallic surfaces, the intermediate use of separate gaskets or the use of cutting rings can be avoided, therefore rendering such pipe couplings ideal particularly for fluid lines carrying aggressive or corrosive liquids.

Particularly in the case of transporting aggressive fluids, very high requirements are placed on the sealing capacity of pipe couplings to ensure operational safety.

SUMMARY

The present invention therefore has the task of providing a pipe coupling as well as a tool for fashioning a pipe and a process for fashioning a pipe with which a pipeline offering an improved sealing effect can be produced.

A similar pipe coupling fulfills this task in that the abutting face of the pipe exhibits at least one sealing protrusion, and that the sealing protrusion is formed as a prominence, in particular as at least a local prominence, in the abutting face.

The pipe coupling presented serves to connect a pipe, specifically to connect the flow cross-section of the pipe with a flow cross-section of the pipe union. When the pipe coupling is assembled, the pipe is retained by the clamping element with its connecting section pressed against the pipe union, in particular at least partially into the receiving section of the pipe union. It is preferable that the pipe union exhibits an external thread and the clamping element exhibits a corresponding internal thread, so that the pipe and the pipe union can be connected with one another in that the clamping element can be screwed to the pipe union with the connecting section of the pipe in between the two. Preferably the connecting section of the pipe exhibits a clamping shoulder which supports the clamping element, wherein a force is exerted on the pipe parallel to the longitudinal axis of the pipe.

A sealing connection, specifically a metal-on-metal sealing connection, is generated between the pipe and the pipe union by the tension between the clamping element and the pipe union. For creating this connection, the pipe exhibits at least one connecting section in at least one of its end regions. It is also possible that the pipe exhibits a connecting area at both of its ends. The connecting area exhibits at least one sealing surface angled in the direction of the corresponding end of the pipe. In its assembled state, this sealing surface fits into the receiving section incorporated into the pipe union, wherein a seal is created between the receiving section and at least a part of the sealing surface.

A sealing protrusion is located on the terminal abutting face of the pipe, in the form of a—local—prominence in the abutting face. The term "abutting face" of the pipe specifically refers to the terminal, usually circular, end face of the pipe, namely the cut face of the pipe wall. The connecting section of the pipe is formed by plastic deformation of the pipe, thus subsequently "abutting face" will refer to the original abutting face of the undeformed pipe. It is also preferable that the sealing protrusion is formed by plastic deformation of the pipe within the connecting section.

For example, the pipe can have an outer diameter between 6 mm and 22 mm and a wall thickness between 1 mm and 4 mm, wherein the following pipe sizes are listed as examples (outer diameter×wall thickness): 6×1, 8×1, 10×1, 12×1, 14×1.5, 15×1.5, 16×1.5, Particularly through the formation of the connecting section on the pipe by means of plastic deformation, the abutting face can be inclined at an angle deviating from 90° in relation to the longitudinal axis of the pipe, for example at an angle between 50° and 90°, more specifically between 65° and 75°, preferable approximately 70°. Provided that the abutting face exhibits a curvature, it is preferable that the tangents to the abutting face, except in the area of the sealing protrusion, are inclined between 50° and 90°, or rather between 65° and 75°, especially approximately 70°, with respect to the longitudinal axis of the pipe.

The sealing protrusion is formed as a prominence in the abutting face, so that the sealing protrusion protrudes from the abutting face. It is preferable that the sealing protrusion is formed as a local prominence, thus as a prominence in a part of the abutting face. The sealing protrusion is circumferential, specifically rotationally symmetrical. It is preferential that the sealing protrusion, specifically the peak of the sealing protrusion in cross-section, is formed on a larger radius than the remaining part of the abutting face with respect to the longitudinal axis of the pipe.

For example, the invention provides that the sealing protrusion is located in an edge area of the abutting face, so that at least one of its flanks transitions directly into the inclined sealing surface of the connecting section. Specifically the sealing protrusion is formed in a radially outlying edge area. It is preferential that the cross-section of the sealing protrusion exhibits a wide base which tapers progressively up the sealing protrusion. In cross-section, the flanks of the sealing protrusion approach one another with increasing height.

The sealing protrusion improves the functional properties of the pipe in the receiving section of the pipe union, wherein the sealing effect is increased.

It has proven to be especially advantageous for the sealing effect of the pipe coupling when, in accordance with a first design, the sealing surface of the pipe comprises a first section which is inclined at angle α with respect to the longitudinal axis of the pipe, and that the sealing surface comprises a second section which abuts the first section on the side of the end zone of the pipe, and which exhibits at least one radius R1. Thus the first section of the sealing surface has the circumferential surface of a truncated cone and tapers in the direction of the end zone of the pipe—in the direction of the abutting face. In its assembled state, it is preferable that the sealing surface is at least partially in contact with a corresponding opposing sealing surface in the receiving section of the pipe union, wherein the sealing effect is achieved.

Connecting to the first section of the sealing surface is the second section, which is advantageously curved with a first radius R1. The second section is arched and connects to the first truncated cone-shaped section. Furthermore it is provided that the second section is composed of a series of successive radii, or arch-shaped with a continuously changing radius.

It is advantageously provided that at least one flank of the sealing protrusion forms at least a part of the second section of the sealing surface. This is the case when the sealing protrusion is located in an edge area of the abutting face. Radius R1 is preferably <5 mm, specifically <3 mm; more preferably, R1 is 2 mm. Angle α with respect to the longitudinal axis of the pipe can be between 15° and 25°, specifically between 18° and 22°, and preferably 19°.

In accordance with a further design of the pipe coupling, it is advantageously provided that the sealing protrusion exhibits a first flank and a second flank, and that the first and second flanks approach each other in the direction of the peak of the sealing protrusion. Thus the sealing protrusion converges toward a point in cross-section.

Furthermore the invention provides that the first flank and second flank of the sealing protrusion include an angle ε<120° at any height, specifically <75°, preferably <50°. It is especially preferable that the peak has an angle ε between 40° and 50°, particularly an angle of 45°. Thus the first flank approaches the second flank at angle ε, before the first flank and second flank meet at the peak of the sealing protrusion.

A further design of the pipe coupling provides that the first flank exhibits at least one radius R2 and the second flank exhibits at least one radius R3. The first flank and the second flank exhibit a curved contour in their cross-sections; that is, they have an arch-like shape. In one favorable embodiment, the curvature of the first flank proceeds opposite to the curvature of the second flank. Furthermore the invention provides preferably that the first flank directly connects to the sealing surface, so that the first flank of the sealing protrusion constitutes a part of the sealing surface, specifically that of the second section. It is advantageous that the first flank has a continual transition into the sealing surface. Specifically the first flank of the sealing protrusion constitutes the second section of the sealing surface. The radius R1 of the second section of the sealing surface is preferably identical with the radius R2 of the first flank. For example, the radius R2 can be <5 mm, preferably <3 mm; most preferably, R2 has a radius of 2 mm.

The second flank of the sealing protrusion is preferably curved inward—concave—and transitions continuously into the abutting face. Specifically, the second flank is curved with a radius R3, which is <1.8 mm, preferably <1.2 mm, and most preferably 0.6 mm.

The invention also advantageously provides that the first flank is convex—outwardly curved, and/or the second flank is concave—inwardly curved. A flank profile such as this has a positive effect on the sealing properties of the sealing protrusion.

The first flank and the second flank meet together at a peak of the sealing protrusion, so that the first flank transitions to the second flank at the peak. If the first flank and the second flank are curved and/or exhibit a radius, the peak is the point at which the first flank and the second flank intersect—if necessary, by means of an imaginary extension of the surfaces. For manufacturing reasons, the actual peak of the sealing protrusion on the pipe only approximates the exact mathematical intersection of the two flanks. During the forming process, the material of the pipe does not flow all the way to the bottom of the trough of the swaging tool, with the result that the peak of the sealing protrusion on the pipe will always have a slight rounding, albeit a very small one. For example, this can result in a radius between 0.1 mm and 0.3 mm between the first flank and the second flank.

However, the intersection of the—imaginary—extension of the first flank and second flank is always considered to be the peak of the sealing protrusion. If the first flank and second flank exhibit a radius, the peak is considered as the intersection of the imaginary extension of the first flank and second flank with the corresponding radius.

In design examples in which the first flank and the second flank exhibit a curvature, for example a radius R2 or a radius R3, the angle c between the first flank and the second flank is established as the angle between the tangents to the first flank and the second flank at the corresponding height of the sealing protrusion. It is preferable that the first flank and the second flank are curved in such a manner that the tangents to the first flank and to the second flank include an angle ≤120° at any height of the sealing protrusion. It is preferable that all tangents to the first flank and the second flank at any height between ⅓ the height of the sealing protrusion and ⅔ the height of the sealing protrusion include an angle in the range between 46° and 79°, especially between 56° and 69°.

It is particularly preferable that the tangent to the first flank and the tangent to the second flank in the peak of the sealing protrusion includes an angle between 40° and 50°, specifically an angle of 45°. The intersection of the imaginary extension of the first flank and second flank is thereby always considered to be the peak.

The cross-sectional height and width of the sealing protrusion of the pipe are determined, for example, starting from a plane E, wherein a normal N1 runs parallel to the cross-sectional sealing surface in relation to plane E, specifically parallel to the inclined first section of the sealing surface. Furthermore, the edge between the abutting face and the inner circumference of the pipe lies in this plane. It is preferable that the part of the abutting face without the sealing protrusion lies in plane E. The width of the sealing protrusion is then established as the length of the extension of the sealing protrusion in plane E. The height of the sealing protrusion is defined as the length of the extension along a normal N2 with respect to plane E, which intersects the peak in cross-section. Thus the cross-sectional height of the sealing protrusion is always defined as the distance from plane E of a plane parallel to plane E. The entire height of the sealing protrusion is thus the length of the normal N2 with respect to plane E between plane E and the peak of the sealing protrusion. The width of the sealing protrusion at its base is the cross-sectional extension of the sealing protrusion within plane E.

In accordance with a further design, it proves to be advantageous for the sealing effect when the width of the sealing protrusion lies between 15% and 75%, especially between 18% and 72%, of the pipe wall thickness.

It is preferable that the sealing protrusion has a height between 0.3 mm and 0.5 mm and/or a width at the base between 0.5 mm and 0.9 mm. A height between 0.34 mm and 0.44 mm is especially preferable. Furthermore, a width between 0.67 mm and 0.77 mm is preferable.

Additionally and in accordance with a further design, it is advantageous that the sealing protrusion is formed by plastic deformation of the pipe, particularly through application of force to the abutting face and the sealing surface, thus to the outer circumferential surface of the pipe. For example, the connecting section on the pipe is formed by axial compression in a forming die. For this purpose, the pipe is clamped into a counterholder, with subsequent relative movement between a forming die and the counterholder, so that the end portion of the pipe is formed into a connecting section between the forming die and the counterholder. The forming die is designed such that it at least exerts a force upon the abutting face and the sealing surface, that is, upon the outer circumference of the pipe. Through the force of the forming die upon the abutting face, the abutting face is at least partially pressed in the direction of the outer circumference of the pipe, wherein the sealing protrusion is formed.

It has also proven advantageous for the sealing effect when, in accordance with a further design, the sealing surface exhibits at least one smooth area, wherein the surface of this smooth area is less rough than at least one other area which is adjacent to this smooth area on the sealing surface. It is preferable that the surface roughness is calculated as an arithmetical mean roughness Ra in accordance with DIN EN ISO 4287 (Publication date: July 2010) and DIN EN ISO 4288 (Publication date: April 1998).

Specifically this smooth area is created during the deformation of the pipe, namely in the creation of the sealing area, in that a force is exerted upon the abutting face of the pipe and the sealing surface. It is preferable that the force upon the abutting face is at least partially directed toward the sealing surface, so that the smooth area is formed by high surface pressure during the deformation process. In this case contact pressures of approximately 1000 MPa act upon at least a part of the sealing surface, particularly the later smooth area, during the deformation process.

The sealing surface is locally smoothed by these very high contact pressures, so that the smooth area is created in that the surface roughness, particularly the arithmetical mean roughness Ra, is markedly reduced in contrast to the remaining areas of the sealing surface.

According to an addition embodiment, the invention provides that the surface roughness is determined by means of an arithmetical mean roughness Ra and the profile depth Pt. Pt is thereby the total height of the profile and thus the sum of the height of the largest profile peak and the depth of the largest profile trough within the measured area. For example, the profile depth frequently distinguishes scratches or grooves in the pipe. Normal longitudinal grooves can have a depth of up to 10 µm, and can be almost completely eliminated in the smooth area during the deformation process.

The deformation process exerts such a force in the smooth area that the arithmetical mean roughness Ra and the profile depth Pt are reduced by at least 50%, specifically by at least 75%, in relation to the original values in that area. For example, the arithmetical mean roughness Ra and the profile depth Pt for commercially available precision tubing are Ra 4 and Pt 10. After the deformation process, the arithmetical mean roughness Ra and the profile depth Pt in the smooth area are Ra 2 and Pt 5, or Ra 1 and Pt 2.5, respectively.

The smooth area of the sealing surface, which is circumferential on the connecting section, in particular in the second section of the sealing surface, improves the sealing effect of the pipe coupling, because the forces exerted during the deformation process serve to remove unevenness in the pipe surface, specifically longitudinal grooves resulting from the manufacturing process. In its assembled state, it is preferable that at least the smooth area of the sealing surface of the connecting section is in contact with the receiving section within the pipe union. Specifically, the smooth area is at least partially in contact with the first flank of the sealing protrusion. It is more preferable that the smooth area is in full contact with the first flank of the sealing protrusion.

In accordance with another design embodiment, the sealing effect is further improved when the pipe union exhibits an opposing sealing surface, wherein the opposing sealing surface exhibits a truncated cone-shaped first section which is inclined at the angle β, that the opposing sealing surface exhibits at least one second section, and that the second section of the opposing sealing surface has a corresponding curve to the second section of the sealing surface. It is preferable that the second section of the opposing sealing surface is curved with a radius R6 of <5 mm, specifically <3 mm, and preferably with a radius of 2 mm. Specifically, the radius R6 of the opposing sealing surface corresponds to the radius R2. Specifically, in its assembled state at least the second section of the sealing surface fully contacts the second section of the opposing sealing surface.

The first section of the opposing sealing surface is inclined at angle β, so that the connecting section of the pipe with the sealing surface can be at least partially inserted into the receiving section. It is preferable that angle β is larger than angle α. It is especially preferable that angle β is approximately 1° larger than angle α. For example, angle α can be between 15° and 25°, specifically between 18° and 22°, and preferably 20°. It is thus ensured that at least the second section of the sealing surface, specifically the smooth area, is in contact with the second section of the opposing sealing surface in its assembled state, which produces a favorable sealing effect. The advantage of this design thus lies in the fact that in its assembled state, primary contact is achieved on the second section of the sealing surface, specifically in the smooth area or the first flank of the sealing protrusion.

A further design of the pipe coupling provides that the pipe union exhibits a longitudinal stop surface, and that the sealing protrusion is in contact with the stop surface in assembled state of the pipe coupling, specifically with its peak in contact with the stop surface. Thus the stop surface limits the insertion of the connecting section into the receiving section of the pipe union. The stop surface is formed in such a manner that the sealing protrusion is at least in partial contact with the stop surface in the assembled state of the pipe coupling.

In a particularly preferred embodiment of the invention, the sealing protrusion and/or the stop surface are deformed in a plastic manner upon assembly. This plastic deformation of the sealing protrusion and/or the stop surface ensures a soft block stop when the unit is fully assembled. It is thereby ensured that in the event of over-tightening with too much torque or too much rotation, there is no plastic deformation of the clamping element or the pipe union, specifically on their threads. It is also simultaneously ensured that the clamping element can later be re-tightened and that the pipe coupling can be easily separated in the future.

A further design of the pipe coupling provides that the peak of the sealing protrusion exhibits a diameter that corresponds to 88% to 99% of the outer diameter of the pipe, especially 91% to 98%. It is especially preferred that the diameter at the peak of the sealing protrusion is about 0.5 mm less than the outer diameter of the pipe. This arrangement of the sealing protrusion in the connecting section of the pipe ensures a favorable combined effect of the connecting section and the receiving section to achieve an optimal sealing effect.

The object of this invention as initially stated is furthermore accomplished with a swaging tool for the creation of a connecting section on a pipe, comprising at least one forming die and at least one counterholder, wherein the forming die exhibits a recess, and wherein the recess exhibits an inclined outer molding surface and an inclined bottom surface. The edge region of the bottom surface exhibits a circumferential recess. It is preferable that the outer molding surface and the bottom surface meet at the trough of the recess. The trough of the recess can have, for example, a diameter which corresponds to between 88% and 99% of the outer diameter of the pipe. It is preferred that the diameter at the trough of the recess is about 0.5 mm less than the outer diameter of the pipe being used.

This recess is specifically provided for the purpose of forming a sealing protrusion on the pipe during the manufacturing process of a connecting section—during the deformation process, in that the pipe material is at least partially deformed into the recess.

The recess in the area between the bottom surface and the outer molding surface ensures that a force is exerted on the abutting face during the deformation process, by which the pipe material is forced in the direction of the sealing surface, that is, in the direction of the outer circumference of the pipe. The pipe material thereby flows partially into the recess and thus creates the sealing protrusion.

In accordance with another embodiment of the invention, it has proven advantageous to design the outer molding surface and the bottom surface in the area of the recess so as to include an angle $\sigma$ of <120°, preferably <75°, especially <50°. It is especially preferable that the trough has an angle $\sigma$ between 40° and 50°, particularly an angle of 45°. If the outer molding surface and/or the bottom surface in this area is curved or has an arching shape, it is especially provided that the angle $\sigma$ is defined between the tangents to the outer molding surface and the bottom surface. The invention preferably provides that all tangents to the outer molding surface and the bottom surface lie between ⅓ the depth and ⅔ the depth of the recess in a region between 46° and 79°, particularly between 56° and 69°. Specifically the tangents to the outer molding surface and to the bottom surface in the trough include an angle $\sigma$ between 40° and 50°, especially an angle of 45°.

It is preferable that the trough of the recess is determined from a plane, wherein in cross-section view, the normal of the plane runs parallel to the first section of the outer molding surface, and wherein the first section of the bottom surface runs in the plane in cross-section view. The normal to this plane, along which the trough of the recess is determined, intersects the trough of the recess.

It is furthermore provided that the inclined outer molding surface initially exhibits a first section, which has the shape of a truncated cone and is inclined by angle $\gamma$ to the axis M of the forming die. For example, angle $\gamma$ can be between 15° and 25°, specifically between 18° and 22°, and preferably 19°. Axis M of the forming die usually corresponds to the longitudinal axis A of the pipe. Connecting to the first section of the outer molding surface is a second, curved section, which is preferably curved with a radius R4. The radius R4 is specifically identical with radius R2 or radius R1.

The curved or arch-shaped second section of the outer molding surface forms the second section of the sealing surface of the pipe as well as the first flank of the sealing protrusion during the deformation of the pipe. The invention further provides that the bottom surface, starting from a first section which has a conical taper with angle $\delta$ with respect to axis M of the forming die, extends to a second section of the bottom surface in the edge region. The second section is at least curved with a radius R5 and extends out to the contact area with the outer molding surface at the trough of the recess. Radius R5 is preferably <1.8 mm, specifically <1.2 mm; more preferably, R5 is 0.6 mm. It is preferable that the recess in the edge region of the bottom surface is formed by the arched second section of the bottom surface as well as by the arched second section of the outer molding surface, so that both flanks of the recess are arched.

Because the conical first section, beginning from the arched second section, adjoins the bottom surface, a circumferential forming collar is created in the bottom surface with at least the radius R5, which acts specifically upon the abutting face of the pipe during the deformation process and thereby generates the second flank of the sealing protrusion, or the smooth area, which is also located on the first flank. Therefore the radius R5 preferably corresponds to the radius R3. A forming die such as this has the additional advantage that it is appropriate for forming a sealing protrusion on a pipe of any wall thickness as long as it has the same outer diameter.

It has proven to be advantageous in the manufacture and maintenance of the forming tool if the forming die can be separated at least in the contact area between the outer molding surface and the bottom surface, i.e. at the trough of the recess. On the one hand, this simplifies the manufacturing process of the forming die, and on the other hand it improves the results of the deformation process, namely the quality of the contours of the connecting section, especially the sealing protrusion.

The object of this invention as initially stated is also accomplished through a process for producing a connecting section on a pipe, wherein the pipe is held in a counterholder, in that the counterholder clamps the pipe around its circumference. The pipe is pressed into a die with an axial relative motion, wherein the forces exerted by the forming die upon the abutting face of the pipe and upon an outer circumferential surface, namely the later sealing surface, of the pipe generate a connecting section with a sealing protrusion.

Since the forming die exerts a force upon the abutting face of the pipe, the material is forced in the direction of the outer circumferential surface—the sealing surface, wherein the material beings to flow and the sealing protrusion is generated. In a favorable manner the smooth area is thereby generated simultaneously.

The force upon the abutting face of the pipe can be more precisely directed when the forming die has an inclined bottom surface, and a force is exerted upon the front face of the forming die by the inclined bottom surface, especially by a curved second section of the bottom surface, in the direction of the outer circumferential surface of the pipe. Therefore the bottom surface of the forming die not only exerts a force parallel to the neutral axis of the pipe, but also an oblique force, which namely is directed obliquely onto the abutting face. The abutting face is thereby curved and the sealing protrusion forms from inside to outside.

BRIEF DESCRIPTION OF THE DRAWINGS

The illustrations show:

FIG. 3a is an enlarged section of the design example in accordance with FIG. 3,

Identical parts are always marked with the same reference numerals in the various figures of the illustrations.

DETAILED DESCRIPTION

In the following description the invention is not limited to the design examples and therefore is not limited to all or multiple design features from the combinations of features described; rather, each individual feature of any/all design examples can be taken individually and thus the individual features described can have significance to the invention on their own and in combination with any other features of another design example, as well as independently from the combinations of features and relationships of the claims, as well as in combination with the features of claims 1, 20, and 24.

Figure 1:
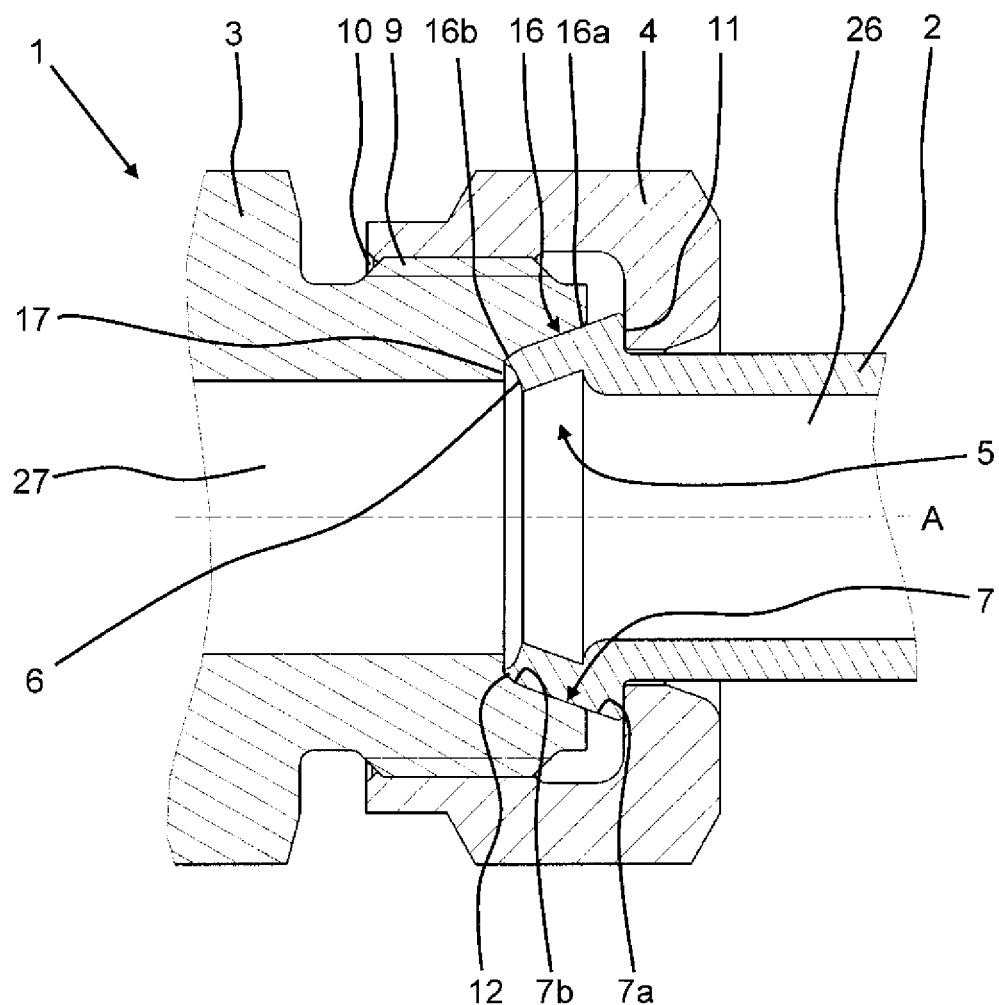
FIG. 1 is a design example of a pipe coupling in a sectional side view.
Figure 2:
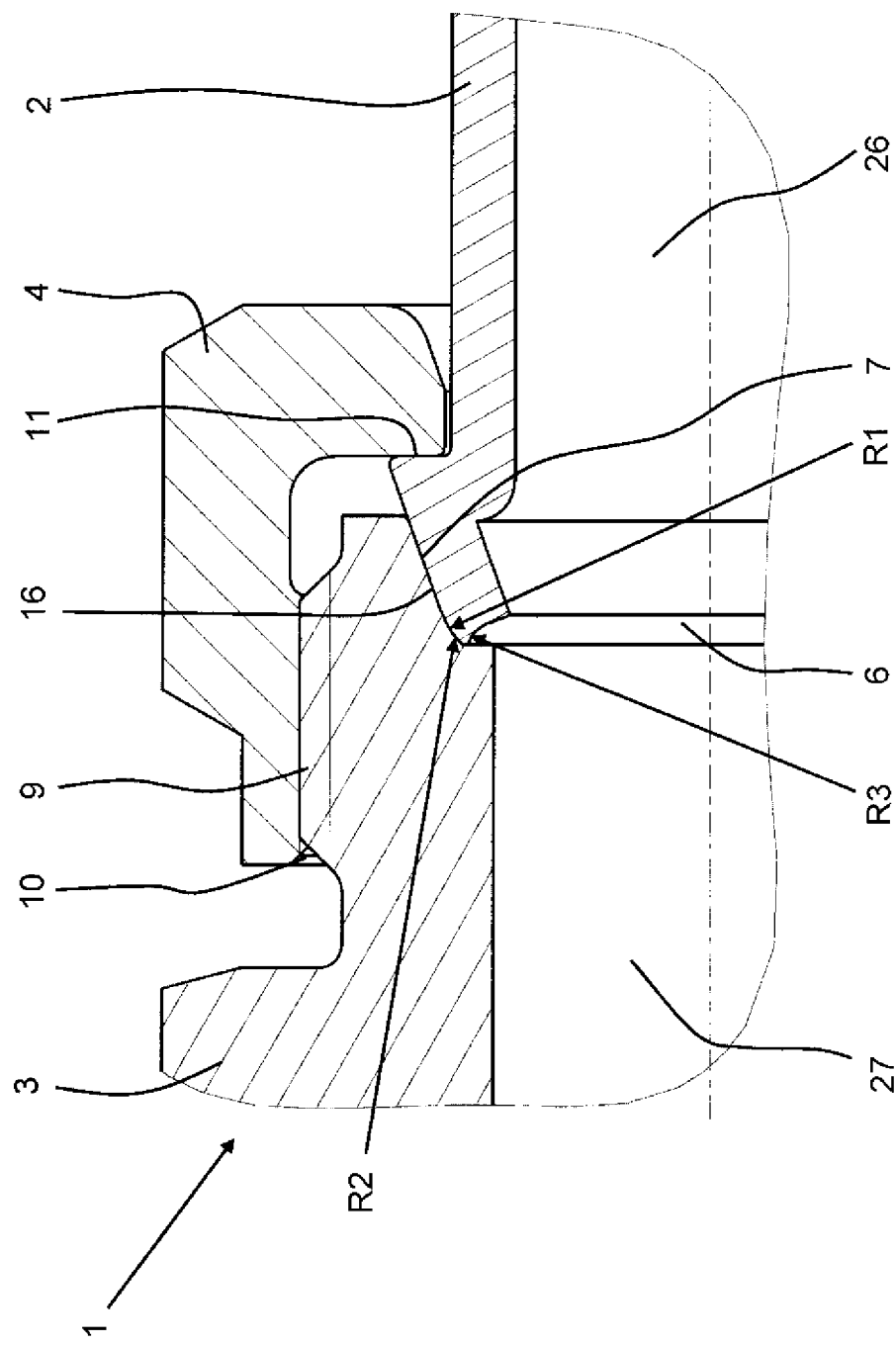
FIG. 2 is an enlarged section of the design example in accordance with FIG. 1.

FIG. 1 shows a cut-away, side view of a design example of a pipe coupling 1 for connecting a pipe 2 in its assembled state. FIG. 2 shows an enlarged section of this design example. The pipe coupling 1 comprises a pipe 2, a pipe union 3, and a clamping element 4. The pipe 2 exhibits a connecting section 5 as well as a terminal abutting face 6. The connecting section 5 is formed in an end region of the pipe 2 and exhibits a sealing surface 7 which is inclined in the direction of the end zone of the pipe.

In order to create a sealing connection between the pipe 2 and the pipe union 3, the pipe union 3 exhibits a receiving section 8, which in the assembled state illustrated accommodates at least a part of the connecting section 5. The open flow cross-section 26 of the pipe 2 is connected to the open flow cross-section 27 of the pipe union in terms of uninhibited flow. The pipe union 3 has a connecting thread 9, onto which the clamping element 4 is screwed with a corresponding clamping thread 10, so that the clamping element 4 via a clamping shoulder 11 exerts a force upon the pipe 2 which is essentially parallel to the longitudinal axis A of the pipe 2. As a result, pipe 2 is clamped between the pipe union 3 and the clamping element 4; specifically, the connecting section 5 is pressed against the receiving section 8 of the pipe union 3. The abutting face 6 exhibits a sealing protrusion 12, which is formed as a local prominence in the abutting face 6.

Figure 3:
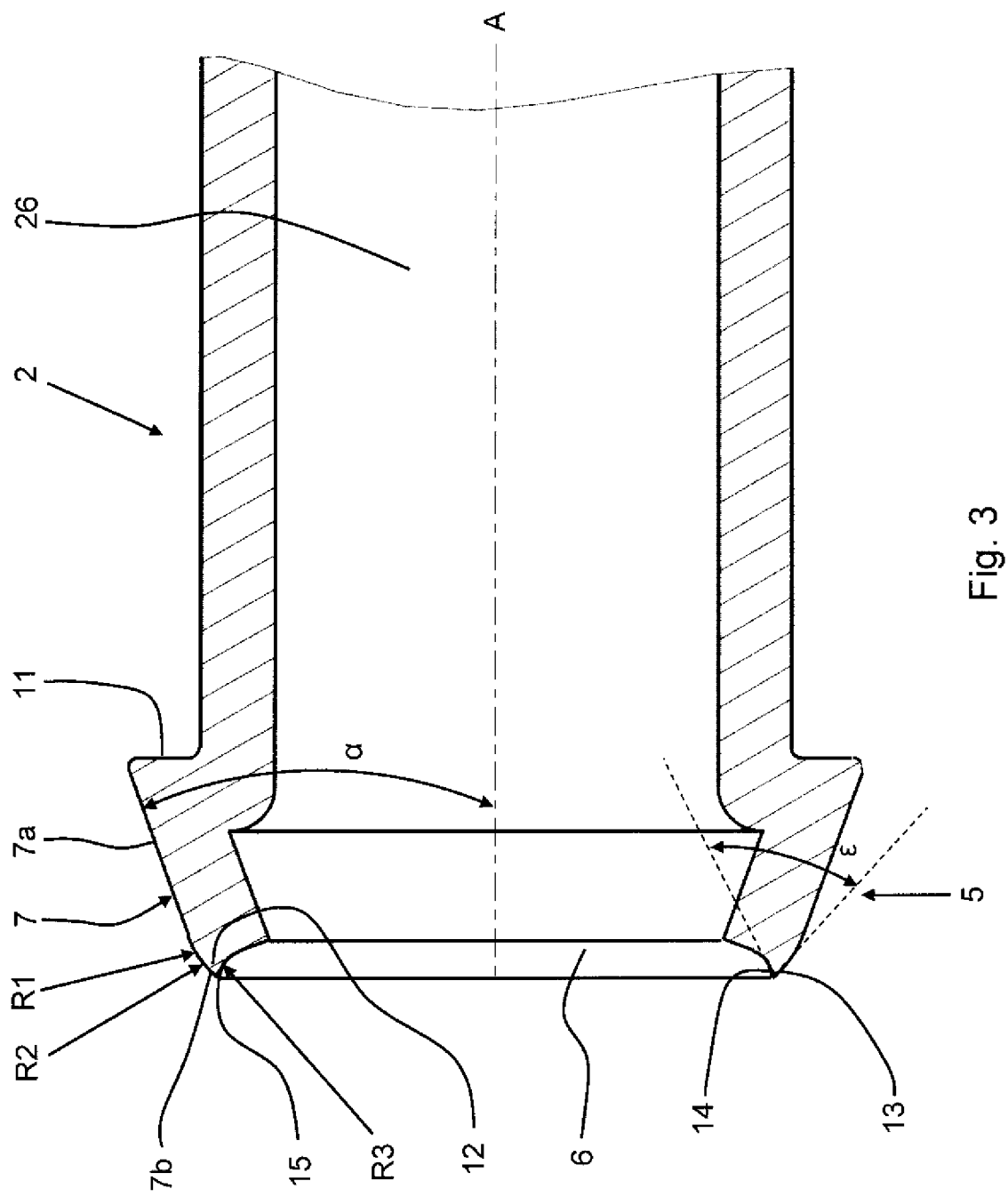
FIG. 3 is an design example of a pipe for a pipe coupling.

FIG. 3 shows a cross-sectional side view of a design example of a pipe 2 for a pipe coupling 1, for example corresponding to FIG. 1 and FIG. 2. The sealing surface 7 comprises—specifically in accordance with FIG. 2, FIG. 3, and FIG. 3a—a first section 7a, which has a truncated conical shape inclined at an angle α with respect to the longitudinal axis A of the pipe. In the direction of the end zone of the pipe 2, a second section 7b connects to the first section 7a, which is curved with a radius R1 of 2 mm. A first flank 13 of the sealing protrusion 12 is part of the second section 7b of the sealing surface 7. The first flank 13 of the sealing protrusion 12 and a second flank 14 of the sealing protrusion 12 approach one another in the direction of a peak 15 of the sealing protrusion 12. The curvature of the second flank 14 is concave, while the curvature of the first flank 13 is convex. The sealing protrusion 12 transitions continuously through the second flank 14 into the remaining portion of the abutting face 6.

The first flank 13 is curved with a radius R2 of 2 mm, which in this design example coincides with radius R1, with the result that the second section 7b has a uniform curvature. Furthermore, the second flank 14 is curved with a radius R3 of 0.6 mm. The tangent to the first flank 13 and the tangent to the second flank 14 include at the peak 15 an angle α, which in this design example is approximately 45°.

The connecting section 5 comprises a clamping shoulder 11, which is in contact with the clamping element 4 in its assembled state. The clamping shoulder 11 is formed orthogonally to the longitudinal axis A of the pipe 2 in the design example corresponding to FIG. 3. The peak 15 of the sealing protrusion 12 forms the transition from the first flank 13 to the second flank 14. The sealing protrusion 12 is formed circumferentially on the pipe 2. In this design example, a smooth area is formed in the second section 7b, in which the arithmetical mean roughness Ra is less than the arithmetical mean roughness Ra in the first section 7a. The arithmetical mean roughness Ra is less in the second section 7b because the smooth area is created by the forces generated during the plastic deformation process.

FIG. 3a shows an enlarged section of the design example in accordance with FIG. 3. The cross-sectional height of the sealing protrusion 12 can be determined as the length of the extension along the normal N2 with respect to plane E and along the peak 15 of the sealing protrusion 12. The normal N2 intersects the peak 15 of the sealing protrusion 12. In cross-section, plane E is oriented such that the normal N1 of plane E runs parallel to the sealing surface 7, specifically to the first section 7a of the sealing surface 7. Furthermore, the edge 34 between the abutting face 6 and the inner circumference of the pipe 2 lies in this plane. The width of the sealing protrusion 12 can be determined as the length of the extension of the sealing protrusion 12 within plane E. Plane E is reoriented for every section of the pipe 2.

The first section 7a extends from the clamping shoulder 11 to the point at which a curvature of the sealing surface 7, and thereby the second section 7b of the sealing surface 7, begins. Plane E marks the beginning of the first flank 13 in the second section 7b of the sealing surface 7. The radii R1 and R2 coincide in this design example. The tangent to the first flank 13 and the tangent to the second flank 14 include an angle c of approximately 45° at their peak 15. The second flank 14 of the sealing protrusion 12 transitions into the remaining part of the abutting face 6 with the radius R3, which in this example lies completely within plane E.

Figure 4:
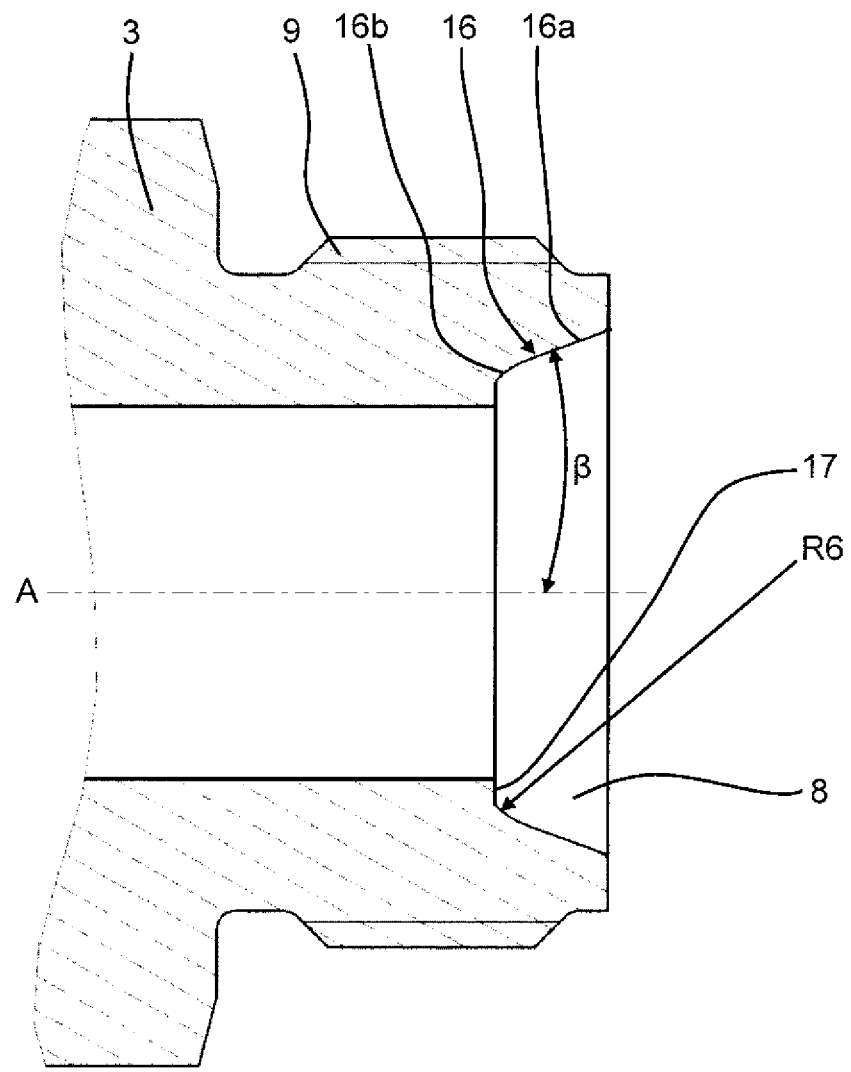
FIG. 4 is a design example of a pipe union for a pipe coupling.

FIG. 4 shows a cross-sectional side view of a design example of a pipe union 3 for a pipe coupling 1 corresponding to FIG. 1 and FIG. 2. Specifically in accordance with FIG. 2 and FIG. 4, the pipe union 3 exhibits an opposing sealing surface 16, which comprises a first section 16a, which is inclined by angle β. In this design example in accordance with FIG. 1 and FIG. 2, angle α and angle β are identical.

A second section 16b of the opposing sealing surface 16 connects to the first section 16a of the sealing surface, specifically in accordance with FIG. 2 and FIG. 4. The second section 16a is formed in correspondence to the second section 7b of the sealing surface 7, specifically it is curved with a radius R6, which in this design example corresponds to the radius R2 of the pipe in accordance with FIG. 2. The pipe union 3 exhibits a stop surface 17, which serves as a longitudinal stop point along the longitudinal axis A of the pipe 2, wherein the sealing protrusion 12 is in contact with the stop surface 17 in the assembled state of the pipe coupling 1, as depicted in FIG. 1 and FIG. 2. Additionally in this design example the entire second section 7b of the sealing surface 7 is formed as a smooth area, wherein the sealing effect is achieved predominantly by the position of the second section 7b of the sealing surface 7 against the second section 16b of the opposing sealing surface 16.

Figure 5:
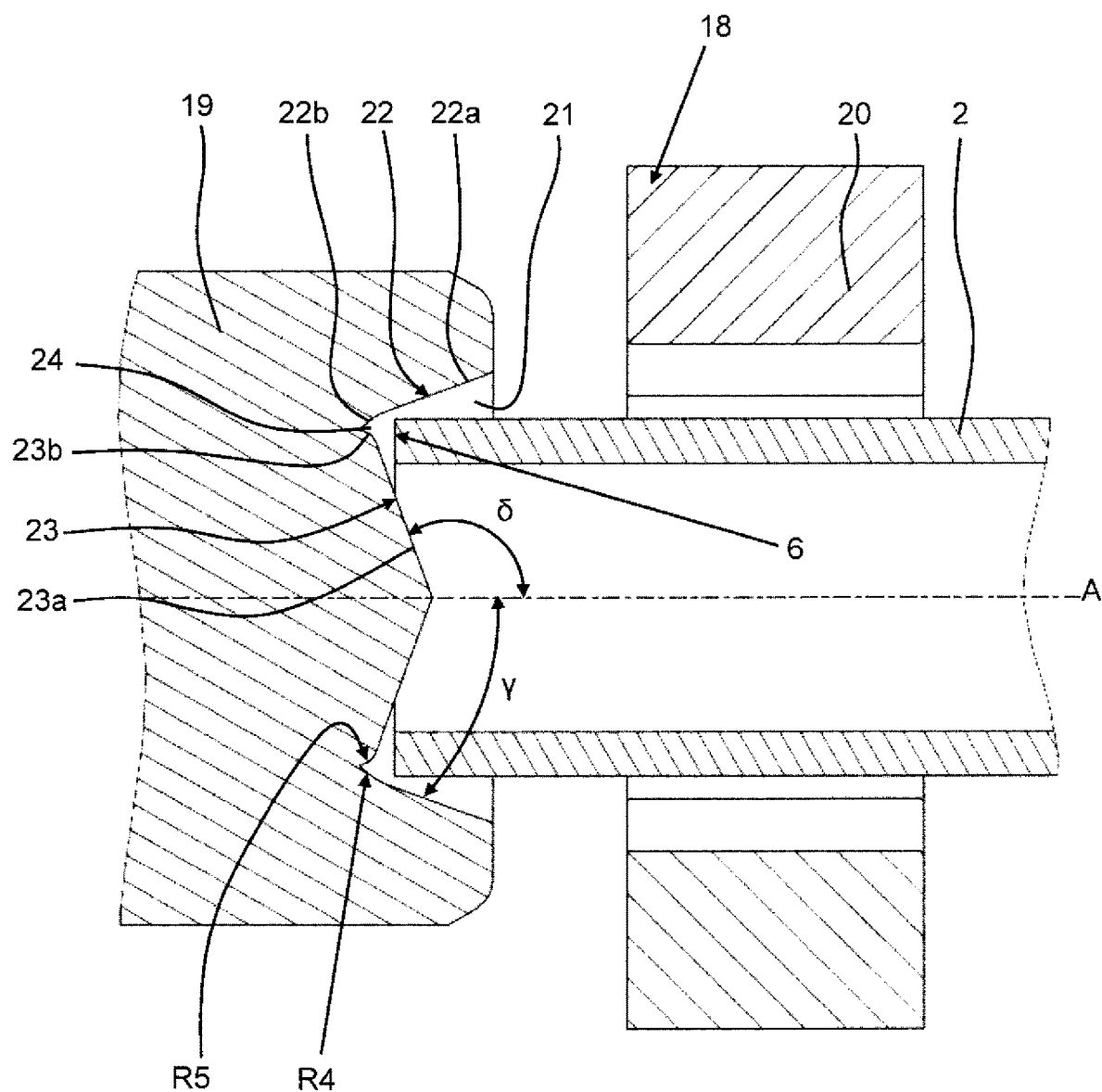
FIG. 5 is a design example of a swaging tool in a first state.
Figure 5A:
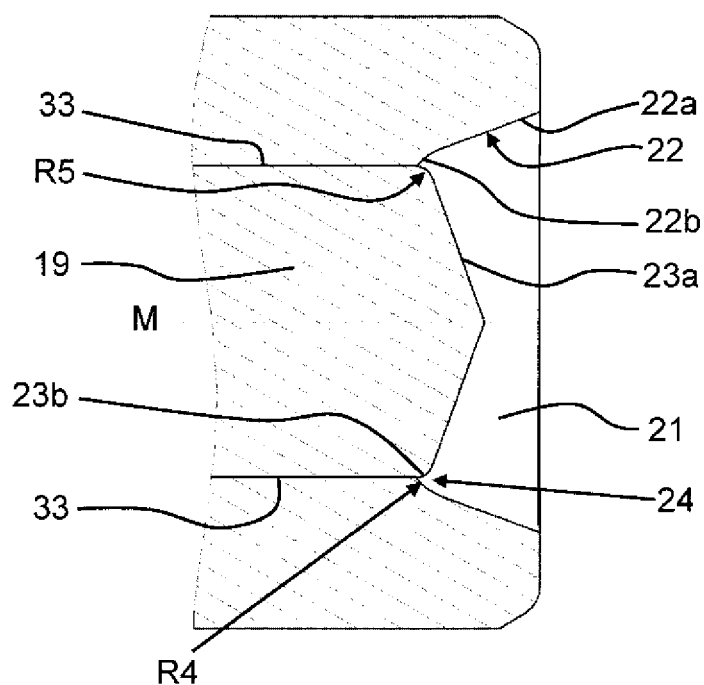
FIG. 5a is a design example of a forming die for a swaging tool.
Figure 5B:
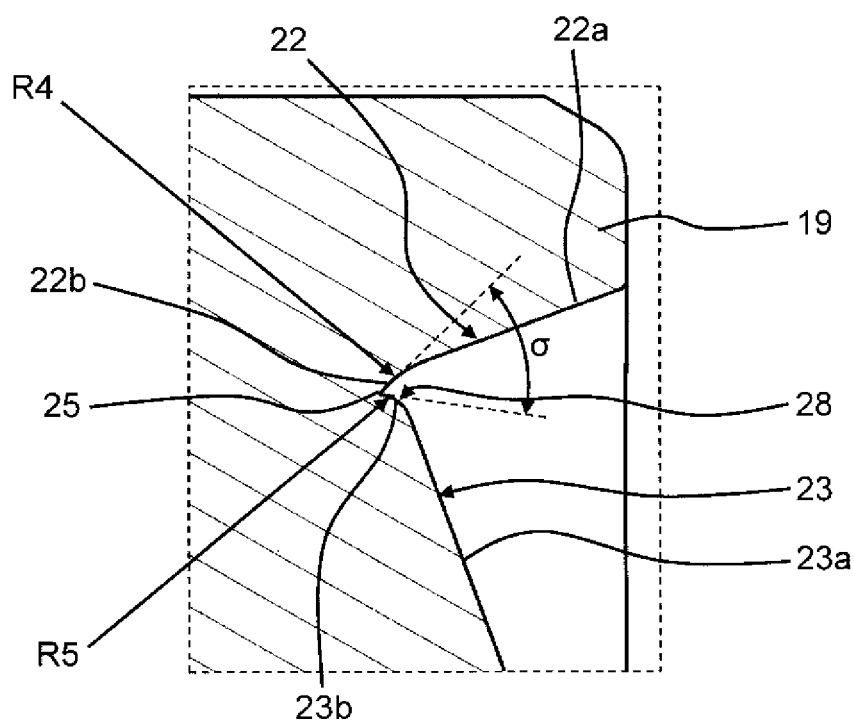
FIG. 5b is a partially enlarged view of the forming die in accordance with FIG. 5a, FIG. 6 is an illustration of the swaging tool in accordance with FIG. 5 in a second state.

FIG. 5 shows a cross-sectional side view of a design example of a swaging tool 18 for creating a connecting section 5 on a pipe 2 in a first state. FIG. 5 specifically shows a pipe 2 that has not yet been deformed. FIG. 5a shows a design example of a forming die 19 for a swaging tool 18, and FIG. 5b shows an enlarged section of the forming die 19 in accordance with FIG. 5a, also in a cross-sectional side view. In accordance with FIG. 5, the swaging tool 18 comprises a forming die 19 as well as a counterholder 20 which is composed of multiple parts. In accordance with FIGS. 5, 5a, and 5b, the forming die 19 exhibits a recess 21, wherein the recess 21 exhibits an inclined outer molding surface 22. Additionally the recess 21 exhibits an inclined bottom surface 23. In the outer area of the bottom surface 23 there is a recess 24 which serves to form the sealing protrusion 12 on the pipe 2 (see FIG. 3 and FIG. 3a for example).

The outer molding surface 22 exhibits a first section 22a, which is inclined at angle γ and is formed with the circumferential surface of a truncated cone. Connecting to the first section 22a is a second section 22b, which is curved with a radius R4. In the example presented, radius R4 is 2 mm and coincides with radius R2 of the first flank 13 of the sealing protrusion 12, or with radius R1 of the second section 7b of the sealing surface 7 on the pipe 2, respectively (see FIG. 2, FIG. 3, and FIG. 3a).

Furthermore, specifically in accordance with FIG. 5a and FIG. 5b, the bottom surface 23 exhibits a first section 23a which is inclined at angle δ. The first section 23a is conical in shape. The angle δ is approximately 110° in this design example. The first section forms the abutting face 6 on the connecting section 5 of a pipe, so that angle δ is supplemented in accordance with the angle of inclination of the abutting face. Furthermore, the bottom surface 23 exhibits a second section 23b, which is curved with radius R5, wherein the radius R5 is approximately 0.6 mm in this design example and corresponds to radius R3. The second section 23b forms the second flank 14 of the sealing protrusion 12 on a pipe 2.

The parting surfaces 33, at which the forming die can be separated, are depicted in FIG. 5a, namely in the area of the trough 25 of the recess 24. For clarity, the parting surfaces 33 are not depicted in FIG. 5b.

From FIG. 5b it is evident that the outer molding surface 22 is formed in the shape of a truncated cone with a first section 22a and converges in the direction of the bottom surface 23. In a second area 22b the outer molding surface 22 exhibits the radius R4, which is 2 mm in size in this design example. The outer molding surface 22 and the bottom surface 23 merge in the recess 24, in particular with the curved second section 22b of the outer molding surface 22 and the second section 23b of the bottom surface 23. The tangent to the outer molding surface 22 and the tangent to the bottom surface 23 include an angle σ in the trough 25 of the recess 24, which in this design example is approximately 45°. The bottom surface 23 exhibits the first section 23a, which is inclined by angle δ with respect to axis M of the forming die. In a second area 23b the bottom surface exhibits the radius R5, which is 0.6 mm in size in this design example. In the second section 23b of the bottom surface 23, a forming collar 28 is formed which presses in particular on the abutting face 6 of the pipe 2 and forces the material of the pipe 2 in the direction of the sealing surface 7 (see also FIG. 7).

Figure 6:
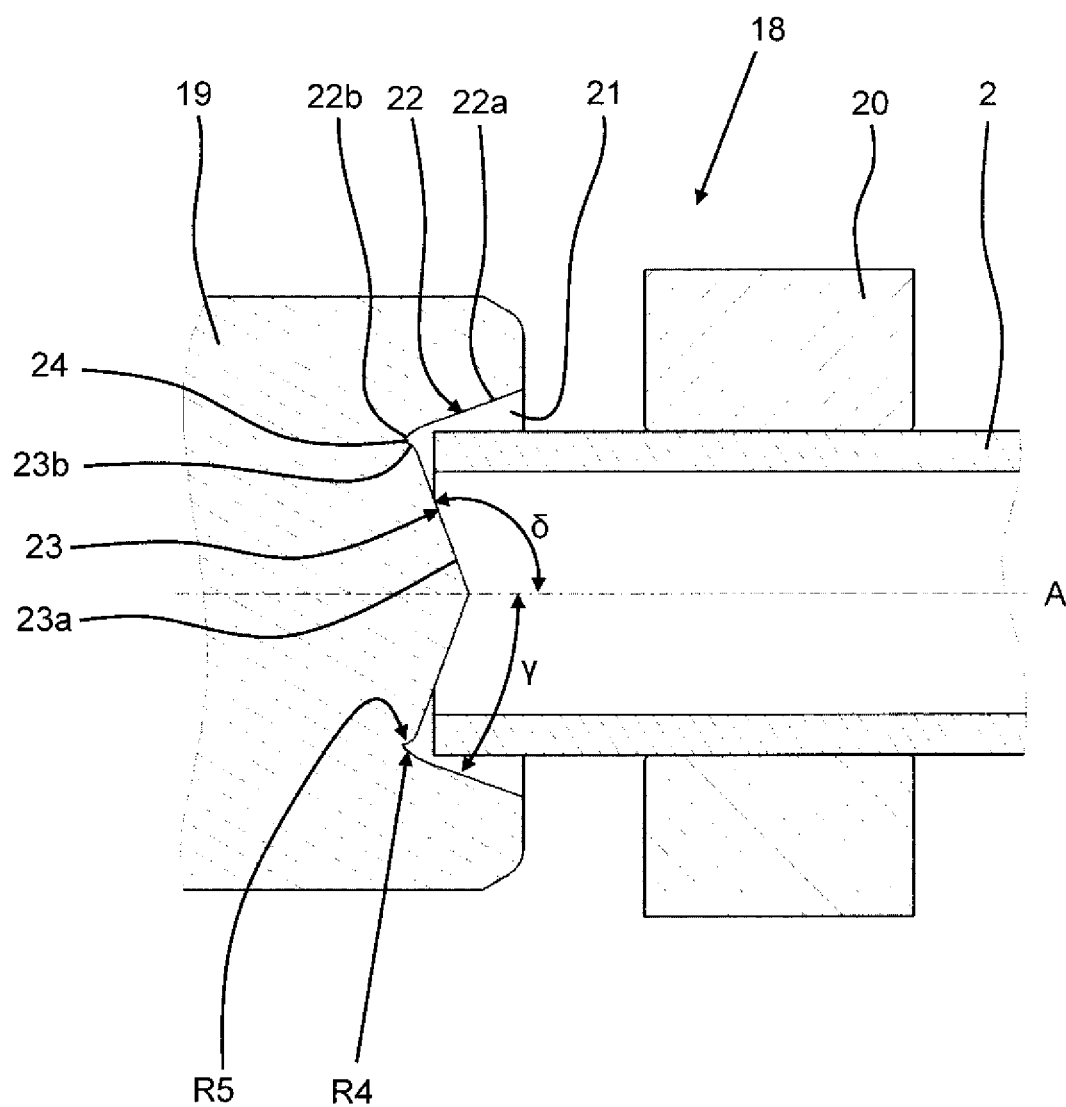

FIG. 6 depicts the swaging tool 18 in a second state, namely with a closed counterholder 20, so that a relative motion between the counterholder 20 and the forming die 19 can take place for the purpose of deforming the pipe 2, by which the end section of the pipe 2 is pressed into the forming die 19.

Figure 7:
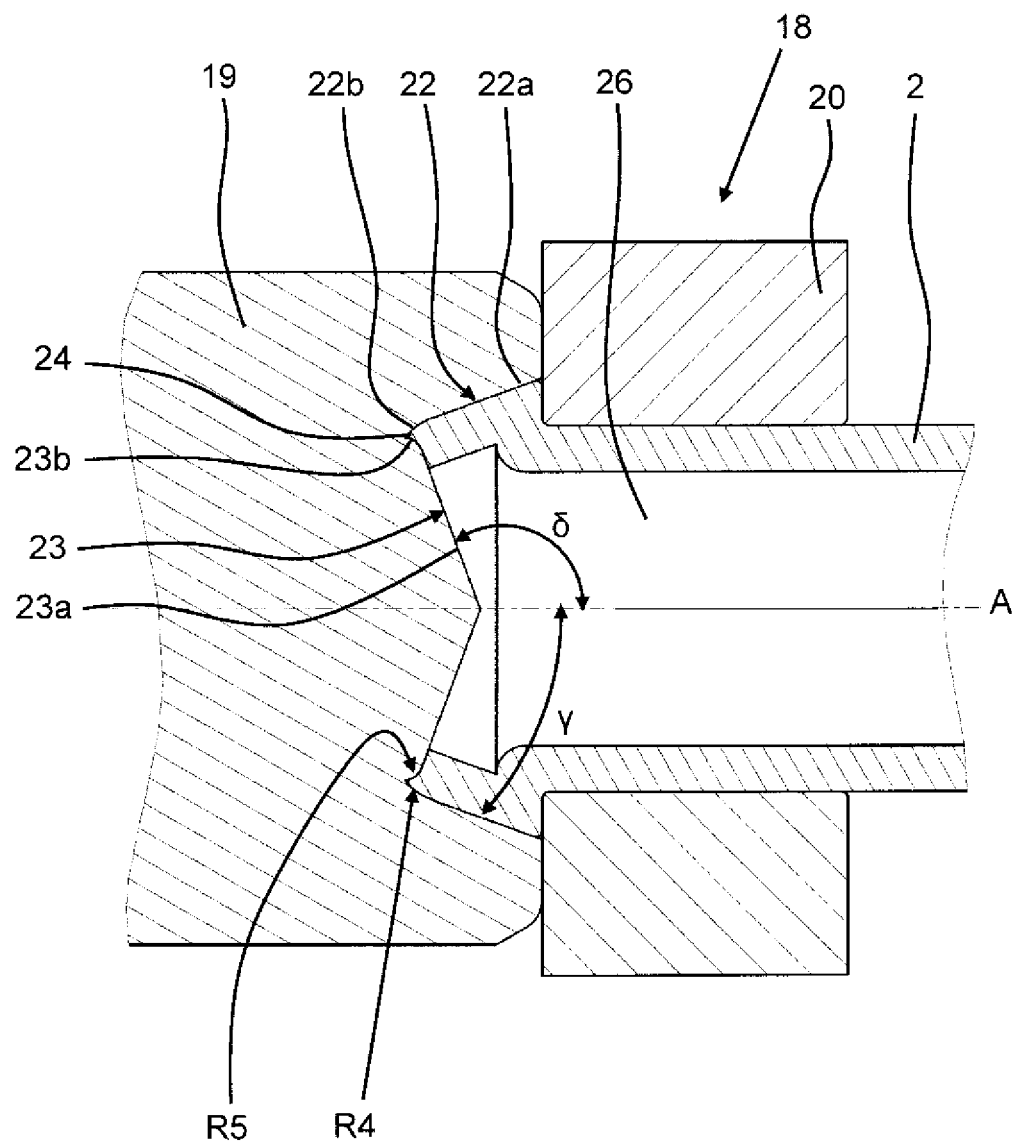
FIG. 7 is an illustration of the swaging tool in accordance with FIG. 5 in a third state.

FIG. 7 depicts the design example of the swaging tool 18 in a third state, namely in its completely closed state. In this state, the connecting section 5 on the pipe 2 has already been formed by the forces employed. It is to be clearly noted how the connecting section 5, particularly the sealing protrusion 12, is formed by the forming die 19, specifically by the recess 24 in the edge region of the bottom surface 23 of the recess 21.

Figure 8:
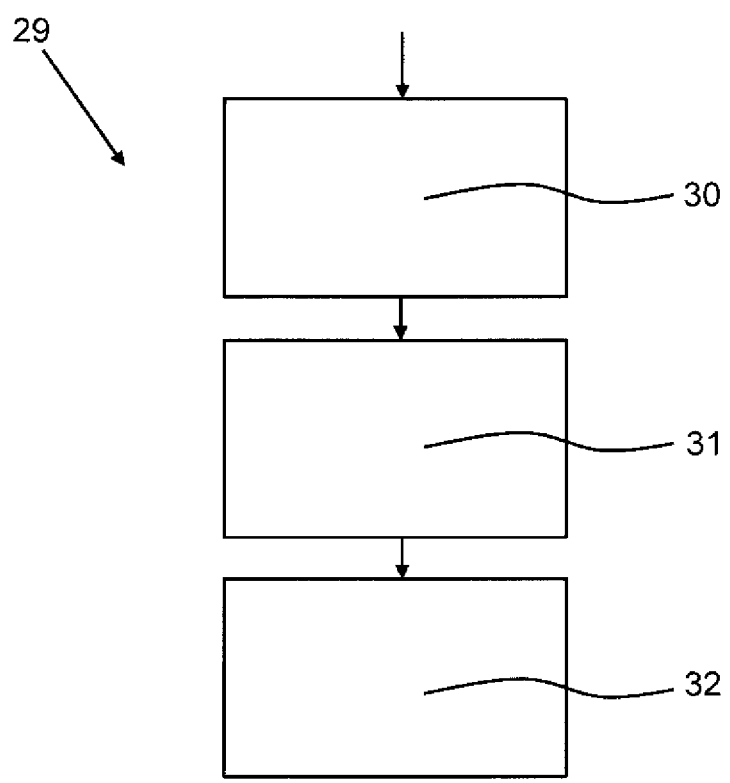
FIG. 8 is a schematic sequence of an exemplary embodiment of a process.

FIG. 8 depicts an example of a schematic progression of the process 29, the first step of which is holding 30 the pipe 2 in a counterholder 20. Following this is the relative movement 31 between the counterholder 20 and the forming die 19, wherein the end section of the pipe 2 is pressed into the forming die 19. The forces exerted by the forming die 19 upon the abutting face 6 of the pipe 2 result in the formation 32 of the connecting section 5 with its sealing protrusion 12.

The invention is not limited to the depicted and described design examples, but rather encompasses all designs of equivalent function in the sense of the invention. It is explicitly noted that the design examples are not limited to all individual features in combination, but rather each individual feature can be meaningful to the invention independently of all other individual features. Furthermore, the invention has hitherto not been restricted to the combination of features as described in claim 1, but rather can also be defined by any other desired combination of features of all of the features described in total. This means that in essence practically every individual feature in claims 1, 19, and 23 can be omitted or replaced by at least one other feature described elsewhere in this application.

The invention claimed is:

1. A pipe coupling for connecting a pipe, comprising a pipe, a pipe union, and a clamping element,
  wherein the pipe exhibits at least one connecting section and a terminal abutting face,
  wherein the connecting section is formed in an end region of the pipe,
  wherein the connecting section exhibits at least one sealing surface inclined relative to a longitudinal axis of the pipe, the pipe union exhibits a receiving section for insertion of at least a part of the connecting section, wherein a sealing connection between the pipe and the pipe union is created in that the connecting section is clamped between the pipe union and the clamping element, wherein the abutting face exhibits a sealing protrusion, and that the sealing protrusion is formed as a local prominence in the abutting face, wherein the sealing protrusion being formed in an edge area of the abutting face at a radially outlying area thereof, wherein the sealing protrusion exhibits a first flank and a second flank, and that the first flank and the second flank approach one another in the direction of a peak of the sealing protrusion wherein the first flank has a convex curve and/or the second flank has a concave curve.

2. The pipe coupling in accordance with claim 1, wherein the sealing surface comprises at least one first section which has a truncated cone shape and is inclined at an angle, the sealing surface including at least one second section adjoining the first section in a direction of the end region of the pipe, and the second section exhibiting at least one radius.

3. The pipe coupling in accordance with claim 2, wherein the pipe union exhibits an opposing sealing surface in the receiving section, that the opposing sealing surface exhibits at least one truncated cone-shaped first section that is inclined at an angle, that the opposing sealing surface exhibits at least one second section, and that the second section of the opposing sealing surface is formed corresponding to the second section of the sealing surface.

4. The pipe coupling in accordance with claim 1, wherein the first flank and the second flank include an angle of less than 120° over an entire height of the sealing protrusion, or less than 75° or less than 50°.

5. The pipe coupling in accordance with claim 1, wherein the first flank and the second flank include an angle at the peak of the sealing protrusion that is between 40° and 50° or is 45°.

6. The pipe coupling in accordance with claim 1, wherein the first flank exhibits at least one radius, and that the second flank exhibits at least one radius.

7. The pipe coupling in accordance with claim 1, wherein the sealing protrusion has a height between 0.3 mm and 0.5 mm and/or a width at the base between 0.5 mm and 0.9 mm.

8. The pipe coupling in accordance with claim 1, wherein the first flank transitions continuously into the sealing surface.

9. The pipe coupling in accordance with claim 1, wherein the abutting face is inclined at an angle between 50° and 90° with respect to the longitudinal axis of the pipe, or at an angle between 65° and 75° or at an angle of 70°.

10. The pipe coupling in accordance with claim 1, wherein the sealing protrusion is formed by plastic deformation of the pipe.

11. The pipe coupling in accordance with claim 1, wherein the pipe union exhibits a stop surface in a longitudinal direction, and the sealing protrusion contacting the stop surface in the assembled state of the pipe coupling.

12. The pipe coupling in accordance with claim 1, wherein the peak of the sealing protrusion exhibits a diameter which corresponds to 88% to 99% of the outer diameter of the pipe or 91% to 98%.

13. The pipe coupling in accordance with claim 1, wherein the sealing protrusion is formed by plastic deformation due to a force being exerted upon the abutting face and the sealing surface of the pipe.

14. A pipe coupling for connecting a pipe, comprising a pipe, a pipe union, and a clamping element,
wherein the pipe exhibits at least one connecting section and a terminal abutting face,
wherein the connecting section is formed in an end region of the pipe,
wherein the connecting section exhibits at least one sealing surface inclined relative to a longitudinal axis of the pipe, the pipe union exhibits a receiving section for insertion of at least a part of the connecting section,
wherein a sealing connection between the pipe and the pipe union is created in that the connecting section is clamped between the pipe union and the clamping element,
wherein the abutting face exhibits a sealing protrusion, and that the sealing protrusion is formed as a local prominence in the abutting face,
wherein the sealing protrusion being formed in an edge area of the abutting face at a radially outlying area thereof,
the sealing surface including at least one smooth area having a surface roughness that is less than a surface roughness of at least one area of the sealing surface adjacent to the smooth area.

15. The pipe coupling in accordance with claim 14, wherein the sealing protrusion exhibits a first flank and a second flank, and that the first flank and the second flank approach one another in the direction of a peak of the sealing protrusion.

16. The pipe coupling in accordance with claim 14, wherein the surface roughness is determined by means of an arithmetical mean roughness and a profile depth, and that a force is applied in the smooth area during the deformation process such that the arithmetical mean roughness and the profile depth are reduced by at least 50% in relation to the initial values in the smooth area or that they are reduced by at least 75%.

* * * * *